US010868411B1

(12) United States Patent
Fleming

(10) Patent No.: US 10,868,411 B1
(45) Date of Patent: Dec. 15, 2020

(54) STRUCTURE TO STRUCTURE ELECTRICAL SERVICE BRIDGING ASSEMBLY

(71) Applicant: Merrion Fleming, Inglewood, CA (US)

(72) Inventor: Merrion Fleming, Inglewood, CA (US)

( * ) Notice: Subject to any disclaimer, the term of this patent is extended or adjusted under 35 U.S.C. 154(b) by 0 days.

(21) Appl. No.: 16/828,231

(22) Filed: Mar. 24, 2020

(51) Int. Cl.
| H02G 1/04 | (2006.01) |
| H02G 1/08 | (2006.01) |
| H02G 3/08 | (2006.01) |
| H02G 3/10 | (2006.01) |
| H02G 3/04 | (2006.01) |
| H02G 7/05 | (2006.01) |
| H02G 3/06 | (2006.01) |
| H02G 3/30 | (2006.01) |

(52) U.S. Cl.
CPC ............... *H02G 1/083* (2013.01); *H02G 1/04* (2013.01); *H02G 3/0406* (2013.01); *H02G 3/0456* (2013.01); *H02G 3/0675* (2013.01); *H02G 3/083* (2013.01); *H02G 3/10* (2013.01); *H02G 3/24* (2013.01); *H02G 7/05* (2013.01)

(58) Field of Classification Search
CPC ..................................................... H02G 1/083
See application file for complete search history.

(56) References Cited

U.S. PATENT DOCUMENTS

| 2,625,580 | A | 1/1953 | Price |
| D180,193 | S | 4/1957 | Majewski |
| 2,836,437 | A | 5/1958 | Wayman |
| 2,916,237 | A | 12/1959 | Belting |
| 2,977,402 | A | 3/1961 | Parkison |
| 4,025,824 | A * | 5/1977 | Cheatham ................ H02B 5/02 361/601 |
| 5,973,264 | A | 10/1999 | O'Connor |
| 6,611,537 | B1 * | 8/2003 | Edens ................. H04L 12/2803 348/E7.05 |
| 6,633,479 | B2 | 10/2003 | Benson |
| 7,022,912 | B1 * | 4/2006 | Kilburn .................. H02G 3/105 174/50 |

* cited by examiner

*Primary Examiner* — Stanley Tso

(57) ABSTRACT

A structure to structure electrical service bridging assembly for electrically connecting a pair of structures includes a rack, a conduit, and a junction box, with each being one of a pair of racks, a pair of conduits, and a pair of junction boxes, respectively. Each rack, conduit, and junction box is mountable to a respective structure, such that each structure is engaged with one rack, one conduit, and one junction box. The rack is external to the structure and the conduit extends upwardly from the junction box to above the rack. The junction box is can be engaged to an electrical circuit of the structure. A set of wires is engaged to and extends between the racks. The wires extend through the conduits and electrically couple the junction boxes. The wires supply electricity from an electrical service of one structure to the electrical circuit of the other structure.

7 Claims, 7 Drawing Sheets

STRUCTURE TO STRUCTURE ELECTRICAL SERVICE BRIDGING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to electrical service assemblies and more particularly pertains to a new electrical service assembly for electrically connecting a pair of structures.

(2) Description of Related Art Including Information Disclosed Under 37 CFR 1.97 and 1.98

The prior art relates to electrical service assemblies, which may comprise an electric service mast.

BRIEF SUMMARY OF THE INVENTION

An embodiment of the disclosure meets the needs presented above by generally comprising a rack, a conduit, and a junction box, with each being one of a pair of racks, a pair of conduits, and a pair of junction boxes, respectively. Each rack, conduit, and junction box is configured to be mountable to a respective structure of a pair of structures, such that each structure is engaged with one of the racks, one of the conduits, and one of the junction boxes. The rack is external to the structure and the conduit extends upwardly from the junction box to above the rack. The junction box is configured to be engageable to an electrical circuit of the structure. A set of wires is engaged to and extends between the racks. The wires extend through the conduits and electrically couple the junction boxes. The wires are configured to supply electricity from an electrical service of one structure to the electrical circuit of the other structure.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
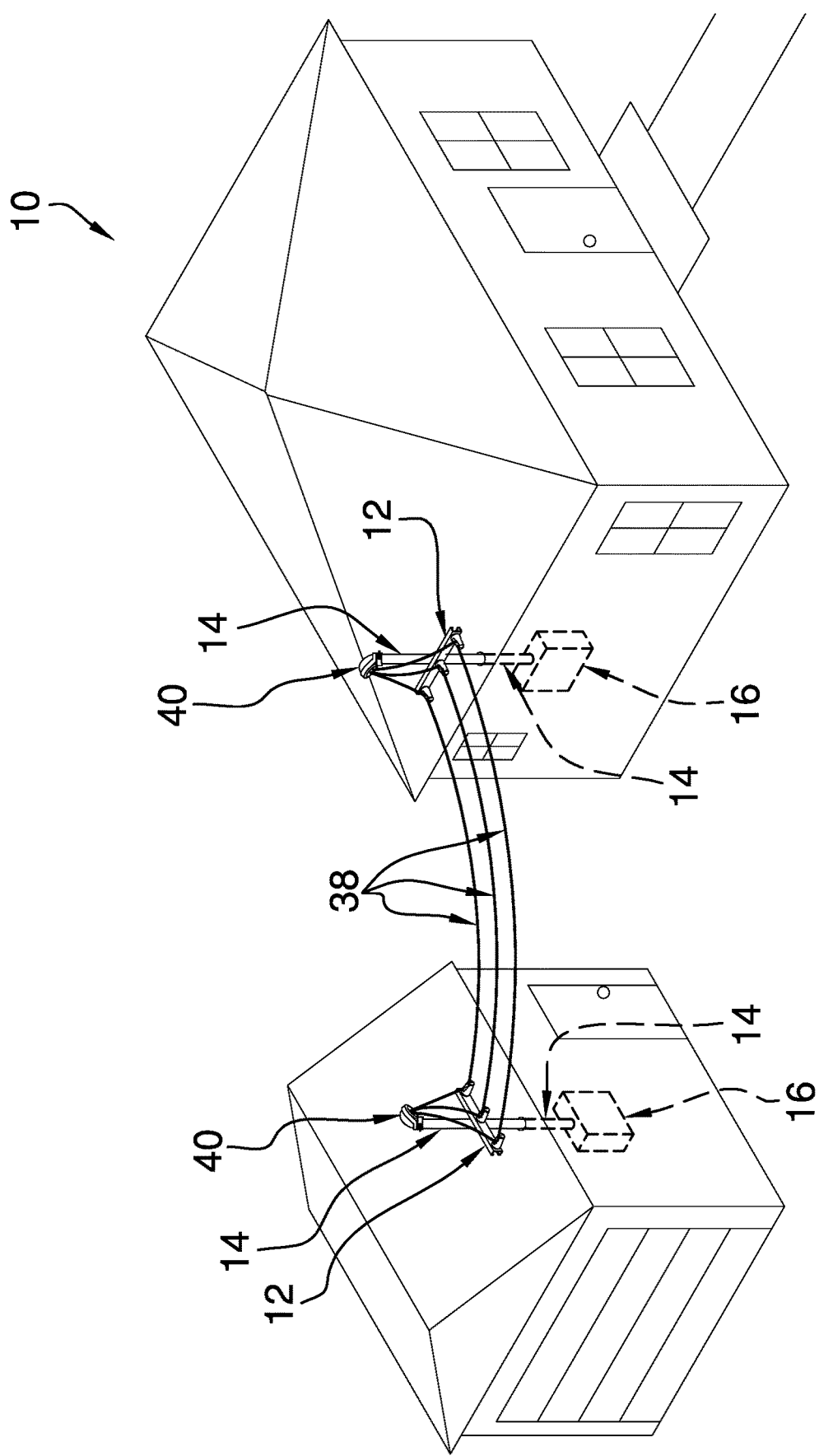
FIG. 1 is an in-use view of a structure to structure electrical service bridging assembly according to an embodiment of the disclosure.

With reference now to the drawings, and in particular to FIGS. 1 through 7 thereof, a new electrical service assembly embodying the principles and concepts of an embodiment of the disclosure and generally designated by the reference numeral 10 will be described.

As best illustrated in FIGS. 1 through 7, the structure to structure electrical service bridging assembly 10 generally comprises a rack 12, a conduit 14, and a junction box 16, with each being one of a pair of racks 12, a pair of conduits 14, and a pair of junction boxes 16 respectively. Each rack 12, conduit 14, and junction box 16 is configured to be mountable to a respective structure of a pair of structures, such that each structure is engaged with one of the racks 12, one of the conduits 14, and one of the junction boxes 16. The junction box 16 is configured to be mountable to at least one of an exterior element and an interior element of the respective structure. The junction box 16 is configured to be engageable to an electrical circuit of the structure.

The rack 12 is external to the structure and the conduit 14 extends upwardly from the junction box 16 to above the rack 12. In one embodiment, as shown in FIG. 1, each junction box 16 is configured to be mountable to the interior element of the respective structure. An associated conduit 14 extends from the junction box 16 through a roof of the respective structure. An associated rack 12 is engaged to the associated conduit 14 between the roof and an upper end 18 of the associated conduit 14.

Figure 2:
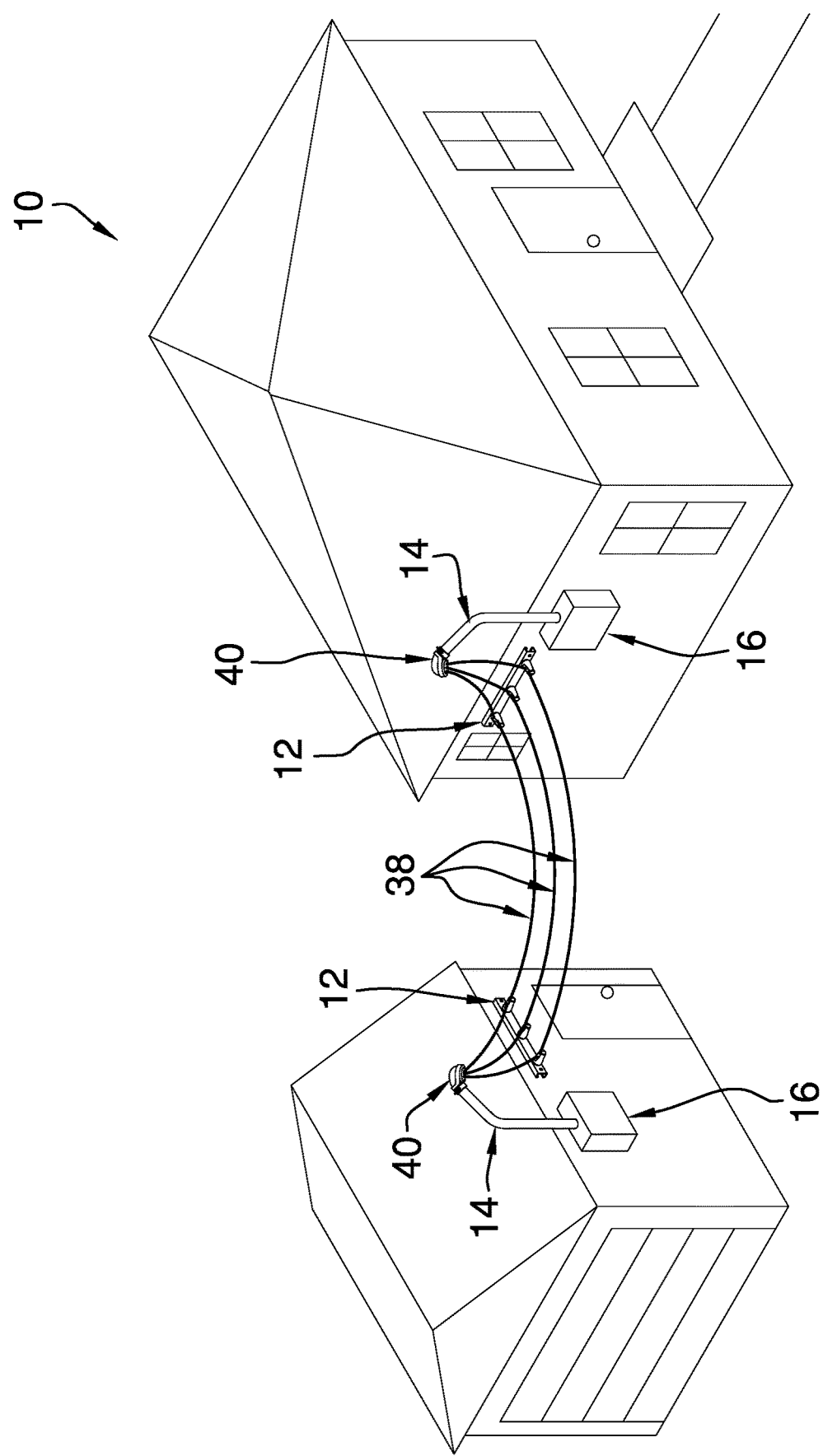
FIG. 2 is an in-use view of an alternative embodiment of the disclosure.

In another embodiment, as shown in FIG. 2, each junction box 16 is configured to be mountable to the exterior element of the respective structure. An associated rack 12 is engaged to the exterior element of the respective structure. An associated conduit 14 extends upwardly from the junction box 16 such that an upper end 18 of the associated conduit 14 is positioned above the associated rack 12.

The present invention also anticipates one boxes of the junction box 16 being engaged to an interior element of one of the structures and the other of the junction box 16 being engaged to an exterior element of the other of the structures.

The rack 12 comprises a beam 20 and a set of insulators 22. The set of insulators 22 comprises three insulators 22. The beam 20 is at least one of engaged to the conduit 14 and being configured to be engageable to an exterior element of the respective structure. The insulators 22 may comprise ceramic, or other electrical insulating material, such as, but not limited to, glass, porcelain, polymer composites, and the like. The insulators 22 are coupled to and electrically insulated from the beam 20. Each insulator 22 has a bolt 24 coupled thereto and extending therefrom. The beam 20 has a set of orifices 26 positioned therethrough. Each orifice 26 is positioned for insertion of a respective bolt 24, positioning the bolt 24 to be threadedly coupled to a respective nut 28 to couple an associated insulator 22 to the beam 20.

Figure 3:
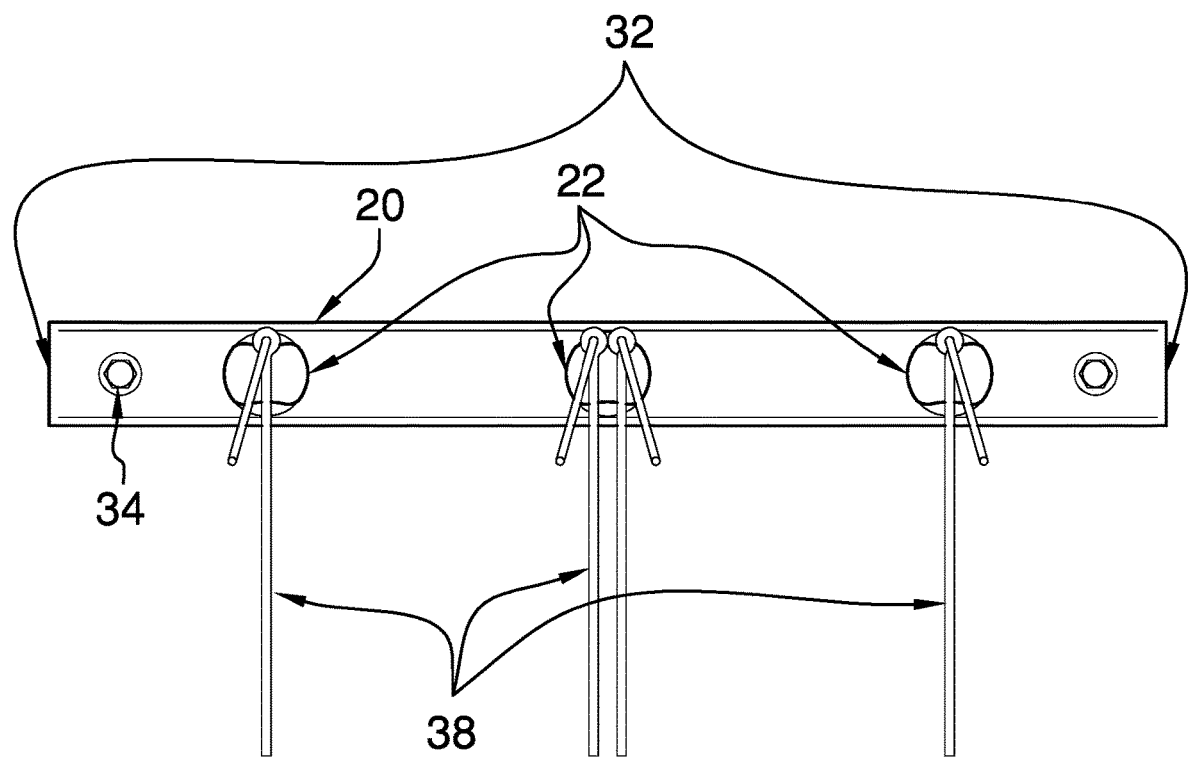
FIG. 3 is a front view of an embodiment of the disclosure.
Figure 4:
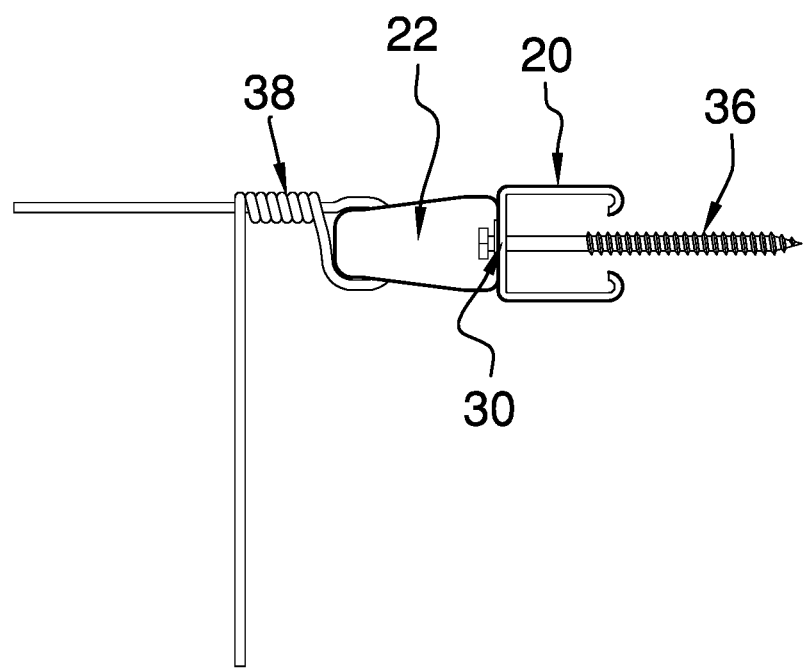
FIG. 4 is a side view of an embodiment of the disclosure.
Figure 5:
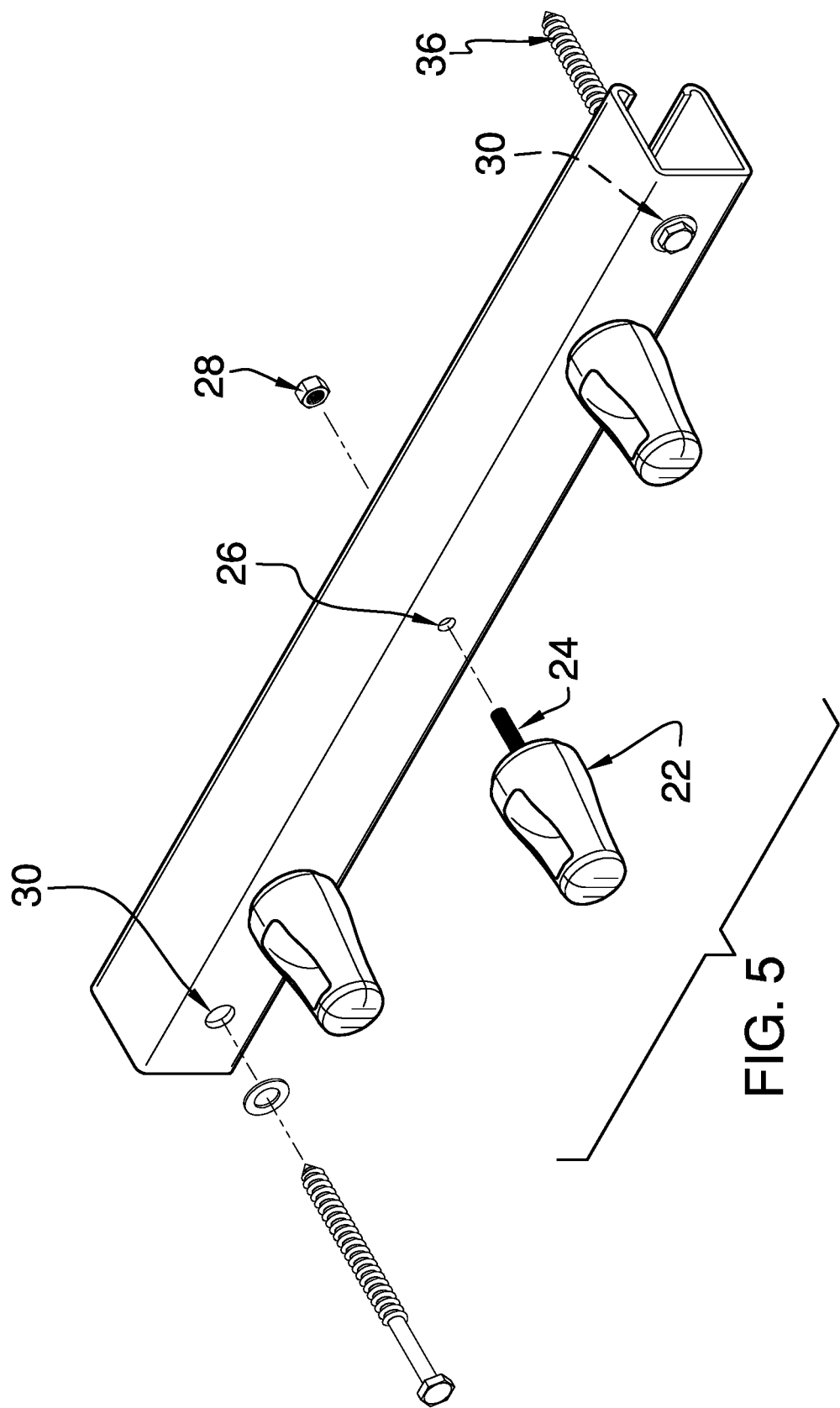
FIG. 5 is an exploded view of an embodiment of the disclosure.
Figure 6:
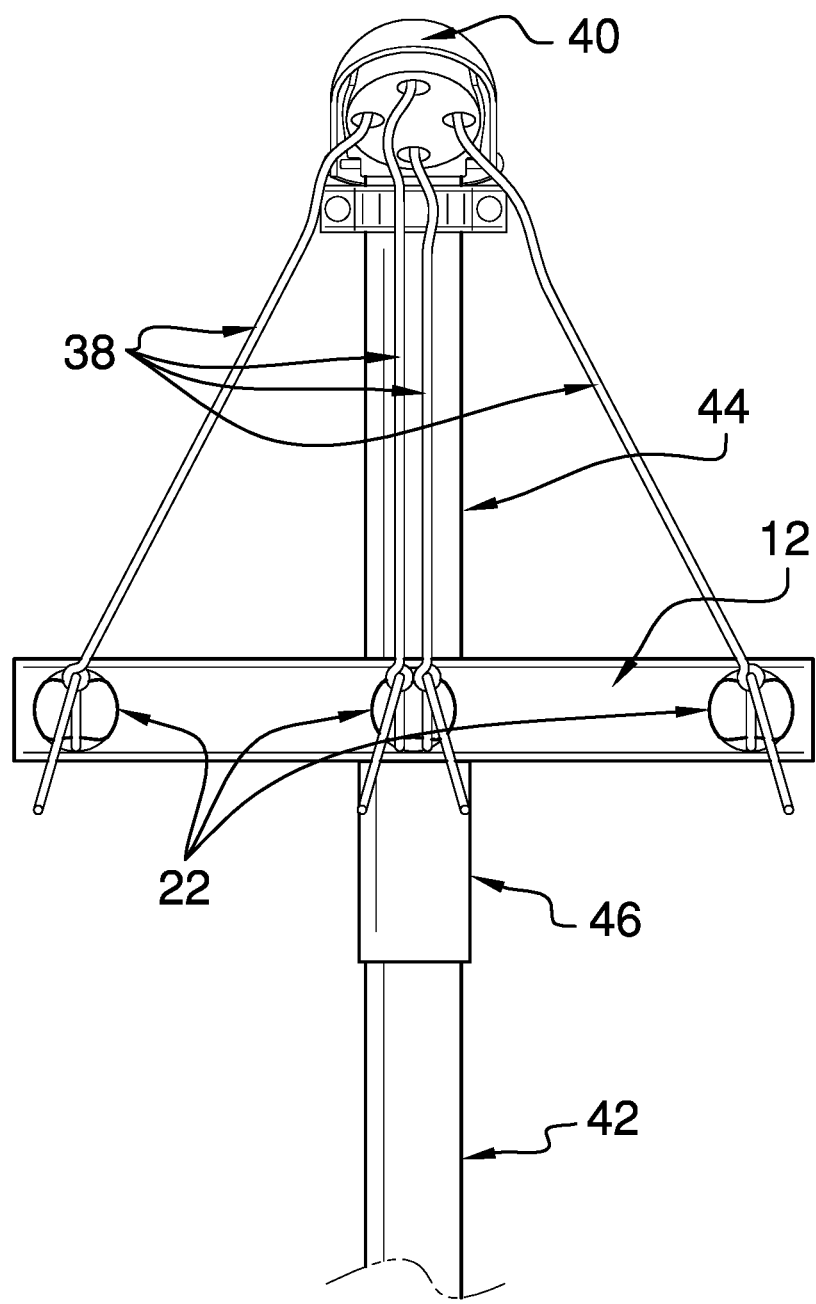
FIG. 6 is a front view of an embodiment of the disclosure.
Figure 7:
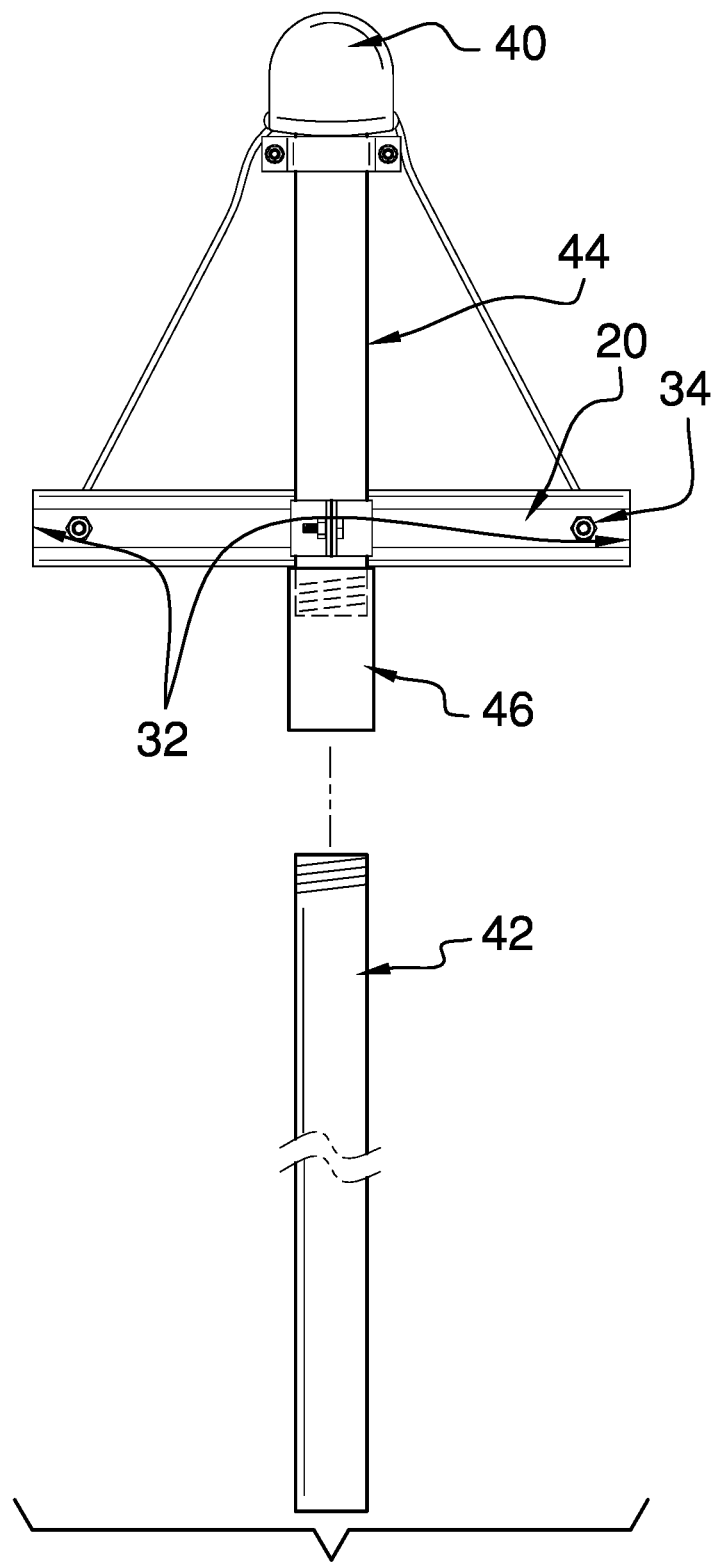
FIG. 7 is a back view of an embodiment of the disclosure.

The beam 20 has a pair of holes 30 positioned therethrough, with each hole 30 being positioned proximate to a respective opposing terminus 32 of the beam 20. Each hole 30 is configured for insertion of a respective fastener 34 to couple the beam 20 to the exterior element of the respective structure. The fastener 34 may comprise a screw 36, as shown in FIG. 3, or other fastening means appropriate for the structure, such as, but not limited to threaded bolts, toggle bolts, and the like.

A set of wires 38 is engaged to and extends between the racks 12. The wires 38 extend through the conduits 14 and electrically couple the junction boxes 16. The wires 38 are configured to supply electricity from an electrical service of one structure to the electrical circuit of the other structure. A user thus is positioned to operationally couple the electrical circuit of one structure, such as a detached garage that lacks electrical service, to the electrical service of another structure, such as a house.

The assembly 10 is anticipated to be useful in providing electrical service to a detached garage. A height of the rack 12 above the ground is determined by a length of the conduit 14, which can be selected to allow for planned activities around and under the set of wires 38, such as vehicle movement and outdoor recreational activities. A gauge of each of the beam 20 and the conduit 14 can be increased to allow for increased distance between the first structure and the second structure.

A service entrance head 40 coupled to an upper end 18 of the conduit 14 and is positioned to direct the wires 38 from the rack 12 into the upper end 18 of the conduit 14. The service entrance head 40 is configured to prevent entry of water into the conduit 14.

The conduit 14 may comprise a lower section 42, which is coupled to the junction box 16, and an upper section 44, which is selectively threadedly couplable to the lower section 42. The lower section 42 being removably couplable to the lower section 42 facilitates installation of the conduit 14, installation of the junction box 16, and feeding of the set of wires 38 through the conduit 14 to the junction box 16. The assembly 10 may comprise a coupler 46, which is selectively threadedly couplable to the lower section 42 and the upper section 44 to removably couple the upper section 44 to the lower section 42.

In one example of use, as shown in FIG. 1, one junction box 16 is mounted to the interior element of a detached garage and the other junction box 16 is mounted to an interior element of a house. The associated conduits 14 extend from the junction boxes 16 through rooves of the detached garage and the house. Each rack 12 is engaged to an associated conduit 14 between the roof and an upper end 18 of the associated conduit 14. The wires 38 extend through the conduits 14 and electrically couple the junction boxes 16. The wires 38 supply electricity from the electrical service of the to the electrical circuit of the detached garage.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A structure to structure electrical service bridging assembly comprising:
   a rack,
   a conduit,
   and a junction box,
   the rack being one of a pair of racks,
   the conduit being one of a pair of conduits,
   the junction box being one of a pair of junction boxes,
   each rack, conduit, and junction box being configured to be mountable to a respective structure of a pair of structures such that each structure is engaged with one of the racks, one of the conduits, and one of the junction boxes,
   such that the rack is external to the structure,
   and such that the conduit extends upwardly from the junction box to above the rack,
   the junction box being configured to be engageable to an electrical circuit of the structure;
   and a set of wires engaged to and extending between the racks,
   the wires extending through the conduits and electrically coupling the junction boxes,
   wherein the wires are configured for supplying electricity from an electrical service of one structure to the electrical circuit of the other structures;
   further including a service entrance head coupled to an upper end of the conduit, such that the service entrance head is positioned for directing the wires from the rack into the upper end of the conduit,
   wherein the service entrance head is configured for preventing entry of water into the conduit;
   wherein the rack comprises:
   a beam,
   the beam being at least one of:
   engaged to the conduit, and being configured to be engageable to an exterior element of the respective structure;

a set of insulators coupled to and electrically insulated from the beam, the insulators comprising ceramic, each insulator having a bolt coupled thereto and extending therefrom, the set of insulators comprising three insulators;

and the beam having a set of orifices positioned therethrough such that each orifice is positioned for inserting a respective bolt, positioning the bolt for threadedly coupling to a respective nut for coupling an associated insulator to the beam;

wherein: each junction box is configured to be mountable to an interior element of the respective structure;

an associated conduit extends from the junction box through a roof of the respective structure;

and an associated rack is engaged to the associated conduit between the roof and an upper end of the associated conduit.

2. The structure to structure electrical service bridging assembly of claim 1, wherein the beam has a pair of holes positioned therethrough, each hole being positioned proximate to a respective opposing terminus of the beam, wherein each hole is configured for inserting a respective fastener for coupling the beam to the exterior element of the respective structure.

3. The structure to structure electrical service bridging assembly of claim 1, wherein the junction box is configured to be mountable to an exterior element.

4. The structure to structure electrical service bridging assembly of claim 1, wherein the conduit comprises a lower section coupled to the junction box and an upper section selectively threadedly couplable to the lower section.

5. The structure to structure electrical service bridging assembly of claim 4, further including a coupler selectively threadedly couplable to the lower section and the upper section for removably coupling the upper section to the lower section.

6. The structure to structure electrical service bridging assembly of claim 3, wherein:

each junction box is configured to be mountable to the exterior element of the respective structure;

an associated rack is engaged to the exterior element of the respective structure; and an associated conduit extends upwardly from the junction box such that an upper end of the associated conduit is positioned above to the associated rack.

7. A structure to structure electrical service bridging assembly comprising:

a rack, a conduit, and a junction box, the rack being one of a pair of racks, the conduit being one of a pair of conduits, the junction box being one of a pair of junction boxes, each rack, conduit, and junction box being configured to be mountable to a respective structure of a pair of structures such that each structure is engaged with one of the racks, one of the conduits, and one of the junction boxes, such that the rack is external to the structure, and such that the conduit extends upwardly from the junction box to above the rack, the junction box being configured to be engageable to an electrical circuit of the structure;

a set of wires engaged to and extending between the racks, the wires extending through the conduits and electrically coupling the junction boxes, wherein the wires are configured for supplying electricity from an electrical service of one structure to the electrical circuit of the other structure;

a service entrance head coupled to an upper end of the conduit such that the service entrance head is positioned for directing the wires from the rack into the upper end of the conduit, wherein the service entrance head is configured for preventing entry of water into the conduit;

the rack comprising:

a beam, the beam being at least one of:

engaged to the conduit, and being configured to be engageable to an exterior element of the respective structure, the beam having a pair of holes positioned therethrough, each hole being positioned proximate to a respective opposing terminus of the beam, wherein each hole is configured for inserting a respective fastener for coupling the beam to the exterior element of the respective structure, a set of insulators coupled to and electrically insulated from the beam, the insulators comprising ceramic, each insulator having a bolt coupled thereto and extending therefrom, the set of insulators comprising three insulators, and the beam having a set of orifices positioned therethrough such that each orifice is positioned for inserting a respective bolt, positioning the bolt for threadedly coupling to a respective nut for coupling an associated insulator to the beam;

the junction box being configured to be mountable to at least one of an exterior element and an interior element of the respective structure;

the conduit comprising a lower section coupled to the junction box and an upper section selectively threadedly couplable to the lower section; and a coupler selectively threadedly couplable to the lower section and the upper section for removably coupling the upper section to the lower section.

\* \* \* \* \*